US012272052B2

(12) United States Patent
Highnam et al.

(10) Patent No.: US 12,272,052 B2
(45) Date of Patent: Apr. 8, 2025

(54) METHOD AND SYSTEM FOR IMAGE NORMALISATION

(71) Applicant: VOLPARA HEALTH TECHNOLOGIES LIMITED, Wellington (NZ)

(72) Inventors: Ralph Highnam, Wellington (NZ); Kaier Wang, Lower Hutt (NZ)

(73) Assignee: VOLPARA HEALTH TECHNOLOGIES LIMITED, Wellington (NZ)

( * ) Notice: Subject to any disclaimer, the term of this patent is extended or adjusted under 35 U.S.C. 154(b) by 344 days.

(21) Appl. No.: 17/640,762

(22) PCT Filed: Sep. 4, 2020

(86) PCT No.: PCT/IB2020/058247
§ 371 (c)(1),
(2) Date: Mar. 4, 2022

(87) PCT Pub. No.: WO2021/044358
PCT Pub. Date: Mar. 11, 2021

(65) Prior Publication Data
US 2022/0335602 A1 Oct. 20, 2022

(30) Foreign Application Priority Data
Sep. 5, 2019 (GB) ..................................... 1912784

(51) Int. Cl.
*G06T 7/00* (2017.01)
*G06T 5/20* (2006.01)
(Continued)

(52) U.S. Cl.
CPC ............. *G06T 7/0012* (2013.01); *G06T 5/20* (2013.01); *G06T 5/77* (2024.01); *G06T 7/11* (2017.01);
(Continued)

(58) Field of Classification Search
None
See application file for complete search history.

(56) References Cited

U.S. PATENT DOCUMENTS 7,593,561 B2 * 9/2009 Zhang ........................ G06T 5/70
382/130
2013/0202165 A1 * 8/2013 Wehnes ..................... G06T 7/11
382/128
(Continued)

FOREIGN PATENT DOCUMENTS

WO  WO-2011137407 A1 * 11/2011 ........... G06K 9/6267
WO  WO-2012116746 A1 *  9/2012 ........... G06T 7/0012
WO  WO-2018183549 A1 * 10/2018 ............. A61B 6/025

OTHER PUBLICATIONS

"International Search Report and Written Opinion of the International Searching Authority," issued in connection with Int'l Appl. No. PCT/IB2020/058247, dated Nov. 17, 2020 (12 pages).
(Continued)

*Primary Examiner* — Mohammed Rachedine
(74) *Attorney, Agent, or Firm* — HOLLAND & HART LLP (57) ABSTRACT

The present invention relates to a method and system for the transformation of raw mammograms to normalised presentation and where the pixel values are independent of imaging conditions. The performed method includes: contrast enhancement, for improved visibility of the breast tissue composition, whereby a region of the breast is segmented and a contrast-stretching algorithm applied to the segmented region to preferably create an enhanced raw image or mammogram; local 'maximum' transform, whereby a 2-dimensional first filter is designed to extract the maximum pixel value from a region of interest (ROI) to preferably create a local maximum image or map; ratio map derivation, whereby the pixel value of the ratio map measures a relative
(Continued)

response of the said pixel to its local maximum thus capturing the difference between breast composition regardless of mammogram variations.

19 Claims, 9 Drawing Sheets

(51) Int. Cl.
　　　*G06T 5/77*　　　(2024.01)
　　　*G06T 5/94*　　　(2024.01)
　　　*G06T 7/11*　　　(2017.01)
　　　*G06T 7/136*　　(2017.01)
(52) U.S. Cl.
　　　CPC .... *G06T 7/136* (2017.01); *G06T 2207/10112* (2013.01); *G06T 2207/30068* (2013.01)

(56) References Cited

U.S. PATENT DOCUMENTS

2016/0314579 A1* 10/2016 Ghouti ................. G06V 10/764
2017/0011534 A1*  1/2017 Costa .................... G06T 7/11

OTHER PUBLICATIONS

Sahba, F., "A new method for the detection of microcalcifications in mammograms", Information Technology And Applications In Biomedicine, 2009, pp. 1-4.

Zhao, Z., et al., "Comparative study of logarithmic image processing models for medical image enhancement", 2016 IEEE International Conference On Systems, 2016, pp. 1046-1050.

* cited by examiner

METHOD AND SYSTEM FOR IMAGE NORMALISATION

CROSS-REFERENCE TO RELATED APPLICATIONS

This is a national phase application of International Application No. PCT/IB2020/058247, filed 4 Sep. 2020, which claims the benefit of United Kingdom Patent Application No. 1912784.4, filed 5 Sep. 2019, the disclosures of which are incorporated herein, in their entireties, by this reference.

FIELD OF THE INVENTION

The present invention relates to a method and system for the transformation of raw mammograms to normalised presentation and where the pixel values are independent of imaging conditions.

BACKGROUND

Mammography is a diagnostic and screening process whereby x-rays are used to examine a breast. Primarily used for breast cancer detection, mammography can also identify abnormalities which relate to other diseases, for example, chronic kidney disease, bone mineral density reduction, diabetes mellitus, metabolic syndrome, hypertension, coronary artery disease and stroke.

Breast screening entails obtaining two views of each breast, that is four mammograms per patient. Recently, to improve diagnosis, a series of two-dimensional (2D) projections have been captured and used to reconstruct a three-dimensional (3D) image, referred to as tomosynthesis or 3D mammography.

Digital mammography generally relates to two types of image: 'raw' and 'processed'. 'Raw' images are the images as acquired, with some technical adjustment such as pixel calibration and inhomogeneity correction; 'processed' images are images derived from the raw images that have been modified to improve spatial resolution (for example, contrast equalisation, or enhanced).

Essentially a mammographic image is a radiation attenuation map and the display of the raw mammographic image varies significantly across different imaging modalities and per mammographic equipment (that is, equipment made by different manufacturers) due to inconsistencies in the physics parameters applied to the imaging process to generate a raw image (for example, the radiation dose, the x-ray tube voltage, the filter material etc.).

CAD systems automatically detect and highlight the locations of potential cancer in mammograms. CAD systems use artificial intelligence, pattern recognition, or image processing techniques for automated analysis, and the analysis is then reviewed by a radiologist for a final diagnostic decision.

Figure 1:
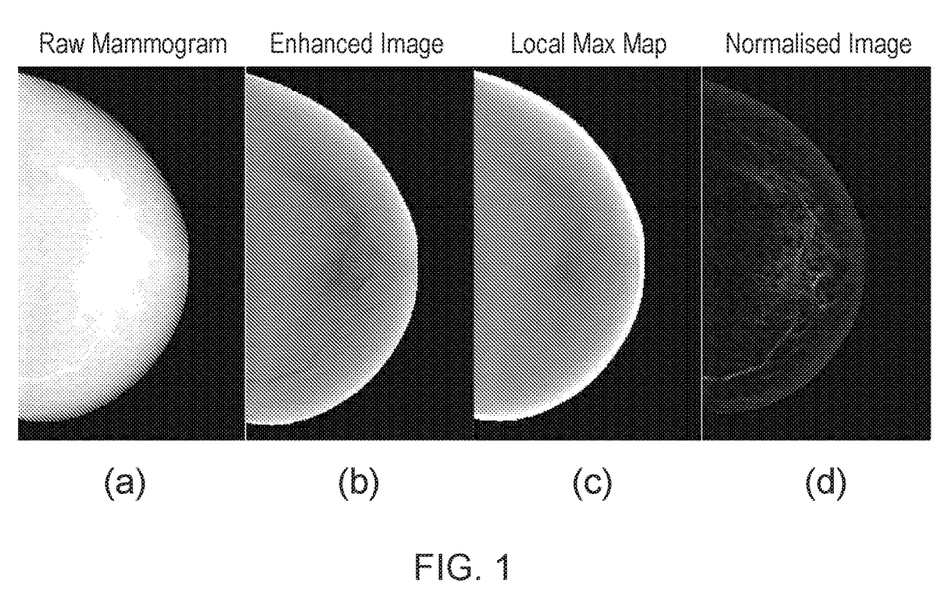

The purpose of CAD is to decrease the false positive rate and improve sensitivity of mammograms. However, the performance of CAD is affected by the presence of breast arterial calcifications (BAC). BACs are calcium deposits along the artery walls in the breast. They are frequently observed on screening mammograms and are one of the most common of false positives marked by a CAD system. An example of BACs is shown in FIG. 1, where, in FIG. 1(d) the BACs are seen as a bright, linear traces in the lower half of the breast.

The detection of BACs in mammograms is a challenging task, in particular due to their topological complexity (BACs can cross and overlap each other). This topological complexity yields a variety of patterns and this variety makes it difficult to define a model to describe BAC.

Furthermore, the intensity values of BACs are not uniform, and their appearance is sometimes similar to healthy breast tissue. Hence, a robust method is required to differentiate and segment BACs from mammograms whereby CAD algorithms can achieve a more consistent performance over raw images from varying modalities and manufacturers.

The present invention provides such solution.

SUMMARY OF THE INVENTION

The present invention relates to a method and system to differentiate and segment BACs from mammograms whereby CAD algorithms can achieve a more consistent performance over raw images from varying modalities and manufacturers. The method may be used to normalise a raw image. According to the method and system, the raw image is normalised by means wherein the pixel values are independent of imaging conditions: a pixel value after filtering represents a relative magnitude between said pixel and neighbouring pixels in the raw image.

According to an aspect of the invention the method comprises three steps as given below.
1) Contrast enhancement, for improved visibility of the breast tissue composition, whereby a region of the breast is segmented and a contrast-stretching algorithm applied to the segmented region to preferably create an enhanced raw image or mammogram.
2) Local 'maximum' transform, whereby a 2-dimensional first filter is designed to extract the maximum pixel value from a region of interest (ROI) to preferably create a local maximum image or map; and
3) Ratio map derivation, (where 'ratio map' means the pixel-wise ratio between the enhanced raw image and its local maximum map), whereby the pixel value of the ratio map measures a relative response of the said pixel to its local maximum thus capturing the difference between breast composition regardless of mammogram variations.

The method is means of normalisation of a raw image for differentiating and segmenting BAC's from other tissue in mammograms. The method decreases the false positive rate and improves sensitivity of mammograms.

The normalised image may be derived from the raw image mammogram according to the above three steps. The normalised image, may show the pixel-wise ratio between pixel-wise contrast enhanced values from step 1 above and respective local maximum values from step 2 above.

In step 2, the local maximum values may be derived by filtering the contrast enhanced values determined in step 1.

The local maximum map may be derived from the contrast enhance mammogram by filtering the contrast enhanced mammogram using the local maximum transform. Preferably the local maximum transform is implemented by the 2-dimensional first filter.

A customised second filter may be applied to the ratio map to aid or perform BAC's extraction. Preferably the customised second filter is a type using Hessian-based multi-scale filtering. The customised second filter may be applied to the ratio map to generate a BAC's probability image. A map or image of showing binary BAC's prediction may be obtained by thresholding the BAC's probability image.

The contrast-stretching algorithm may include: segmenting the breast region in a raw image; and scaling pixel values in the breast region.

The contrast-stretching algorithm may include: segmenting the breast region in a raw image; and scaling pixel values in the breast region. Preferably the contrast stretching algorithm includes saturating scaled pixel values in the breast region and/or determining saturated scaled pixel values in the breast region. The contrast stretching algorithm may include a correction performed on scaled pixel values of a raw image. The raw image may be a saturated image or an image in which the breast region has saturated scaled pixel values.

Preferably the correction is performed using low and/or high saturation parameters indicative of relatively low and relatively high values of the values of the pixels. The low and/or high saturation values may be pixel value of pixels at a preselected low percentile and/or a preselected high percentile of the pixels in the breast region ordered from lowest to highest according to pixel value. The correction may be a gamma correction type.

Gamma correction emphases differences in pixel values aid in differentiating them. For example, two pixels may have pixel values of 1 and 2 respectively in the raw image. After gamma correction, the gamma corrected image may have pixel values of 10 and 50 respectively for the same two pixels. So the contrast between the two pixels is 'stretched'. Preferably the gamma correction includes a calculation which uses saturation parameters which quantify low and high saturation thresholds of pixels in a breast region of the raw image.

Preferably the low saturation threshold is the pixel value of a preselected low percentile of the pixels in the breast region. Preferably the preselected low percentile is the lowest 0.5% or 1% or 2% or 5% of the pixels according to their pixel values. Similarly, preferably the high saturation threshold is the pixel value of a preselected high percentile of the pixels in the breast region. Preferably the preselected high percentile is the highest 0.5% or 1% or 2% or 5% of the pixels according to their pixel values.

Application of the contrast-stretching algorithm could be gamma correction on a saturated raw image where the saturation parameters are determined from scaled pixels in the breast region.

According to another aspect of the invention there is system for transformation of a raw mammogram including an image of a breast to normalise presentation, the system comprising a processor in communication with a memory arranged to:
1) create a contrast enhanced mammogram for improved visibility of breast tissue composition, wherein a region of image of the breast in the raw mammogram stored in the memory is segmented and the processor is arranged to implement a contrast-stretching algorithm applied to the segmented region;
2) create a local maximum map of the contrast enhanced mammogram stored in the memory by performing a local maximum transform, wherein a 2-dimensional first filter implemented by the processor extracts a maximum pixel value from a region of interest (ROI); and
3) use the processor to derive a ratio map and store it in the memory, wherein the ratio map includes a pixel-wise ratio between the contrast enhanced mammogram and the local maximum map stored in the memory, wherein a pixel value of the ratio map is a measure of a relative response of the pixel of the ratio map to its local maximum in the raw image;

The system implements the method of creating a map and image which is independent of imaging conditions.

Preferably the system comprises a display to show the ratio map or a normalised image derived from the map. So person can use the system to see various features in the breast region with clarity.

Preferably processor is arranged to implement the contrast-stretching algorithm to map the pixel values in the breast region to new values to create a contrast enhanced mammogram such that a portion of the new values are saturated at low and high intensities of the input data. So the full range of pixel values between the high and low saturation limits may be 'stretched' to see features in this range with clarity and contrast.

In the system preferably the processor is arranged to process the 2-dimensional first filter on a contrast enhanced mammogram of size m rows and n columns and: break them into overlapped ROIs; convert them into another representation with the image size unchanged; and yield a local maximum map where its pixel represents a local maximum pixel value from the neighbouring pixels in the contrast enhanced mammogram. In this way the 2-dimensional filter is able to extract the maximum pixel value from a region of interest.

Preferably the processor is arranged to read pixel values of the ratio map which range from 0 to 1 and rescale them to an 8, 16, 32 or 64-bit integer to store in the memory as a normalised image. In this way, the normalisation amplifies the distinction between breast composition, so the BACs are in better contrast against other breast tissue.

Preferably the processor is arranged to apply a customised second filter to the ratio map, wherein the second filter is a vessel enhancement filter of a type using Hessian-based multi-scale filtering, tuned to accommodate the characteristics of BACs and a mammogram, to obtain a measure of vessel-probability to generate a BAC's probability image. So false positives and misinterpretations by an expert are reduced since the customised second filter enhances the tubular and elongated structures in the ratio map, which correspond to the BACs patterns.

Further features of the invention are disclosed in the claims. The invention will now be described, by way of example only, with reference to the accompanying figures.

BRIEF DESCRIPTION OF THE FIGURES

FIG. 1 shows the normalising of a raw mammogram, where Normalised Image FIG. 1(d) is the pixel-wise ratio between the Contrast-Enhanced Mammogram FIG. 1(b) (i.e. contrast enhanced version of the Raw Mammogram shown as FIG. 1(a)) and the Local maximum Map FIG. 1(c), where FIG. 1(c) is derived by filtering FIG. 1(b) using a local maximum transform, which is implemented with a 2-dimensional first filter.

DETAILED DESCRIPTION OF THE INVENTION

In an embodiment, the method and system to differentiate and segment BACs from mammograms comprises three steps as given below.
1) Contrast enhancement, for improved visibility of the breast tissue composition, whereby a region of the breast is segmented and a contrast-stretching algorithm applied to the segmented region. The algorithm maps the pixel values in the breast region to new values such that a portion of the data is saturated at low and high intensities of the input data.
2) Local 'maximum' transform, whereby a 2-dimensional first filter is designed to extract the maximum pixel value from a region of interest (ROI). An image of m rows and n columns can be broken into m×n overlapped ROIs, where each is centred at a pixel location (m, n). As a result, the first filter converts an image to another representation with the image size unchanged. Application of the first filter to the enhanced raw mammogram yields an image where its pixel represents a local maximum pixel value from the neighbouring pixels in the enhanced raw mammogram.
3) Ratio map derivation whereby the pixel value of the ratio map measures a relative response of the said pixel to its local maximum. Such relativity captures the difference between breast composition regardless of mammogram variations. As the pixel value of a ratio map ranges from 0 to 1, a rescaling to an 8-bit or 16-bit integer obtains a normalised image.

The pixel value in the normalised image represents a relative magnitude between this pixel and its neighbours in the raw image regardless of imaging conditions. Moreover, the normalisation amplifies the distinction between breast composition, so the BACs are in better contrast against other breast tissue. As illustrated in FIG. 1, the visibility of BACs is significantly improved in the normalised image (FIG. 1(d)) compared to the raw mammogram (FIG. 1(a)). Such clarity facilitates the development of a BAC detection algorithm.

Using Frangi's vessel enhancement second filter, tuned to accommodate the characteristics of BACs and a mammogram, the multiscale second-order local structure is examined (i.e. Hessian matrix) and a measure of vessel-probability is obtained from the eigenvalue of the Hessian matrix. The second filter enhances the tubular and elongated structures in the ratio map, which correspond to the BACs patterns.

Figure 3:
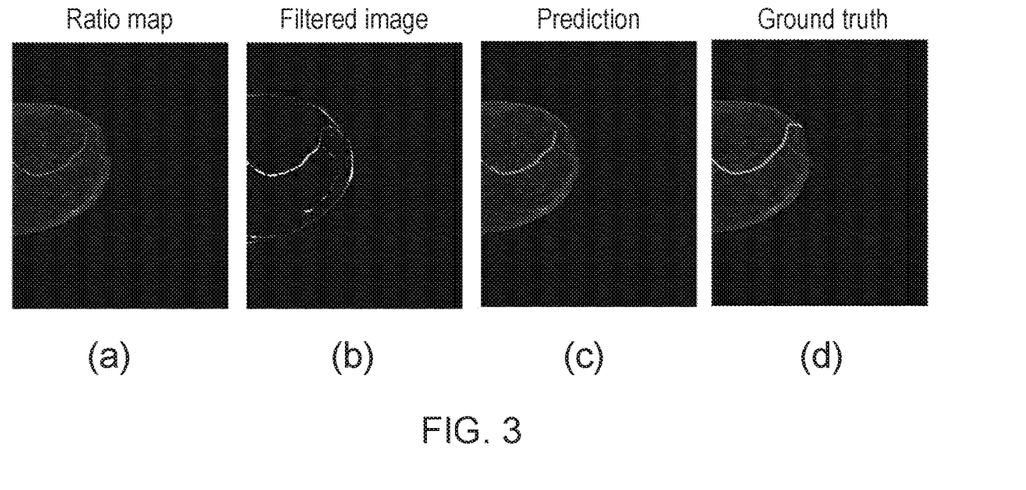
FIG. 3 shows BACs extraction using Hessian-based multiscale filtering. A mammogram is normalised to a ratio map FIG. 3(a); a customised second filter is applied to generate a BACs probability image FIG. 3(b); binary BACs prediction FIG. 3(c) (in blue) is obtained by thresholding FIG. 3(b). The corresponding ground truth mask (in red) is shown in (d).

With reference to FIG. 3, the image normalisation (FIG. 3(a)) amplifies the image gradient, in turn enhancing the contrast of the BACs with surrounding tissue. Frangi's vessel enhancement second filter is applied (FIG. 3(a)), yielding a BAC probability image (FIG. 3(b)). A self-adaptive thresholding algorithm then extracts the final BAC mask from the filtered image (FIG. 3(c)). The extracted BACs (FIG. 3(c)) are in good agreement with ground truth as manually marked by an experienced radiologist (FIG. 3(d)). Origin of ground truth is objective, provable data.

Direct application of Frangi's vessel enhancement second filter on the raw mammogram is not able to enhance the BACs structure in contrast to other breast tissues, which further fail the thresholding algorithm to segment BACs.

Figure 4:
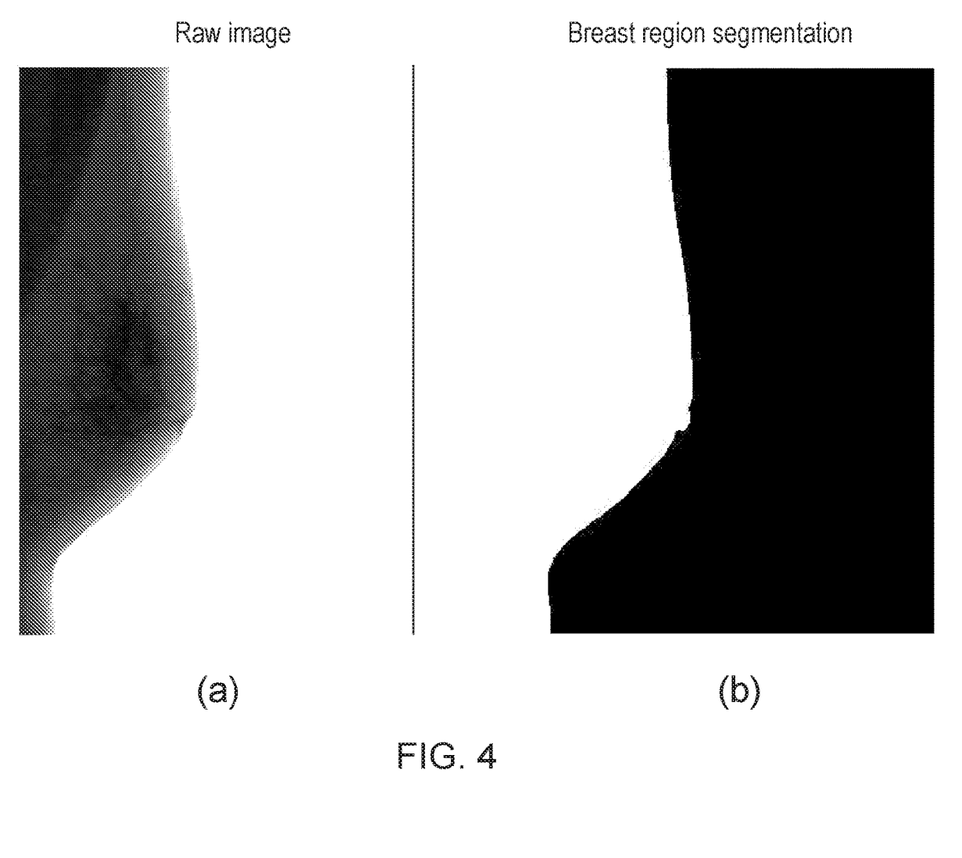
FIG. 4 shows a raw image (a) and its breast region segmentation (b). Here, the raw image is monochrome 2, so its pixel values in the breast region are smaller than the pixel values in the background region.

A further illustrative example of the three steps in the method is given below.
1) Contrast enhancement
   a) the breast region is segmented as follows:
   b) from raw mammogram image FIG. 4(a), a binary image is derived as seen in FIG. 4(b) where non-zero pixels indicate the location of the breast in the corresponding raw image.
   c) the pixel values inside the breast region in the raw image are scaled to a range between 0 and 1 followed by a logarithm transform using equation (1)

Figure 5:
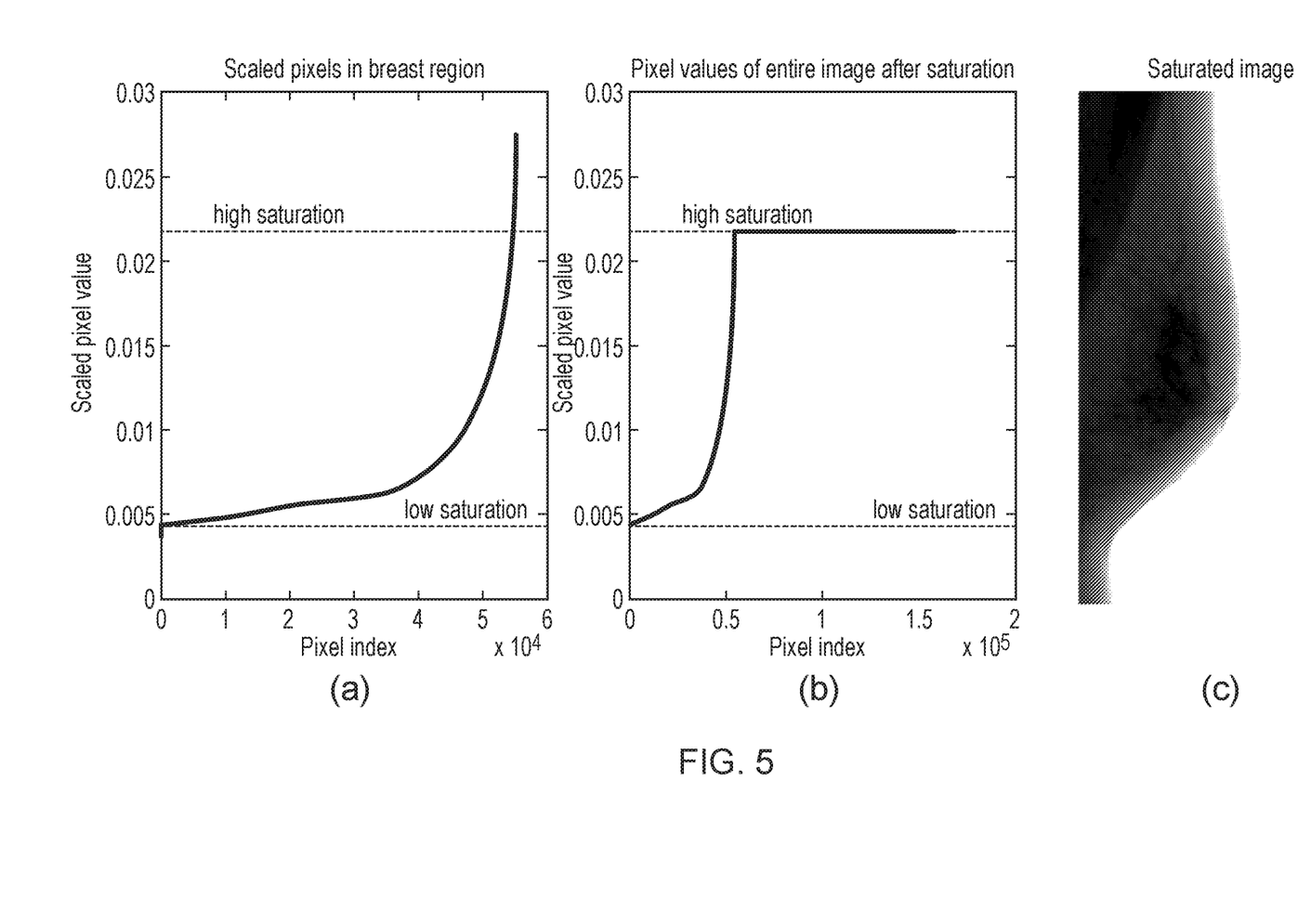
FIG. 5 shows the application of pixel saturation. Among the scaled pixels (see scaling Eq. (1)) in the breast region, the low and high saturation thresholds are determined by the top and bottom 1% of these pixels in (a). The saturation thresholds are applied to the entire image as in (b), yielding a saturated image (c).
Figure 6:
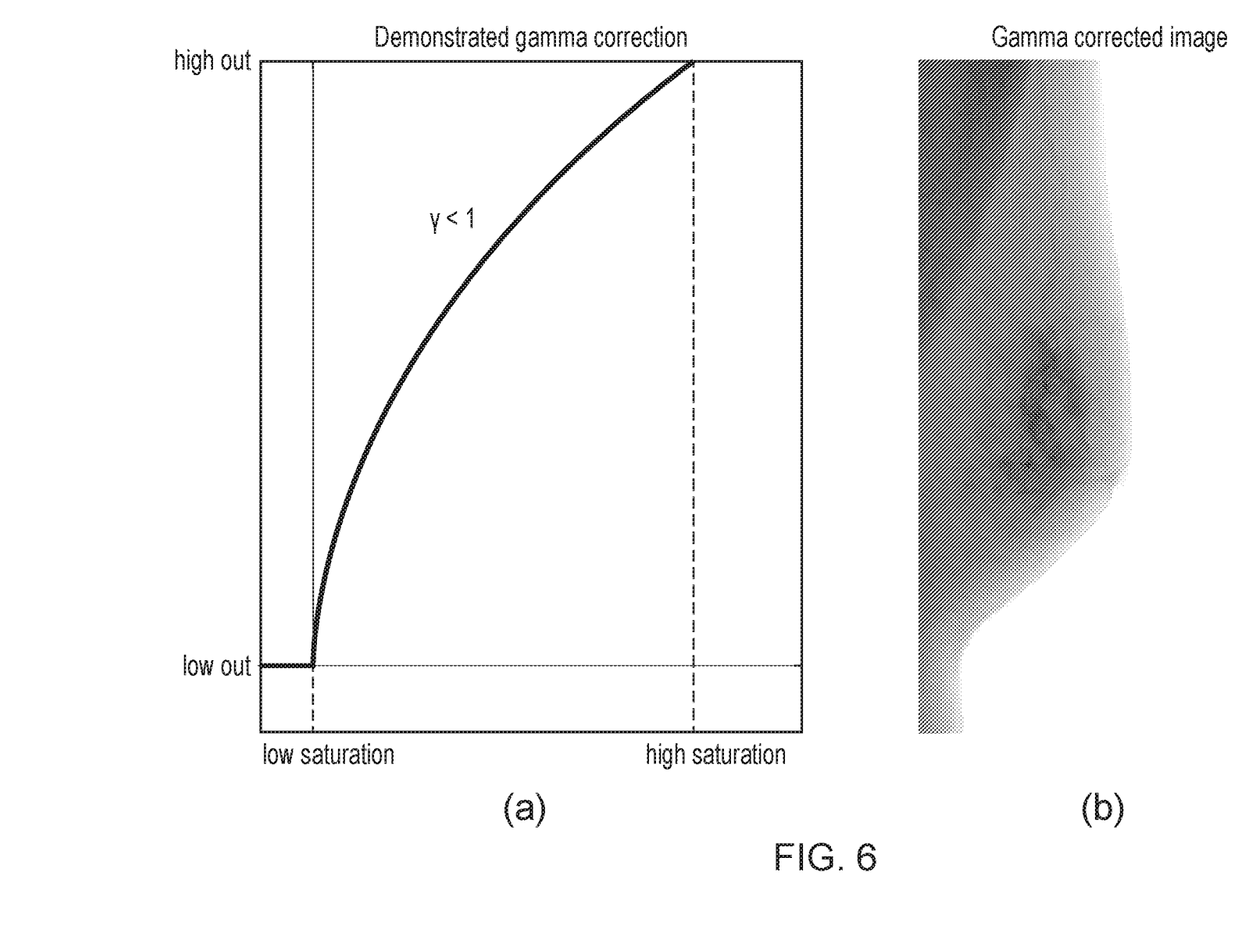
FIG. 6 shows gamma correction where the correction maps low saturation to low out, and high saturation to high out following a nonlinear transform as shown. Gamma correction as applied to FIG. 5(c) yields FIG. 6(b).

Scaled Raw Image=log(Raw Image/65535)   (1)

d) image saturation thresholds are determined, i.e. guided by the segmentation FIG. 4(b), scaled pixels in the breast region of the raw image FIG. 4(a) are sorted in ascending order based on pixel values. Counting these pixels from higher to lower values, the top and bottom 1% of the pixels are determined as saturation thresholds. An illustration of determining saturation thresholds from FIGS. 4(a) and 4(b) is shown in FIG. 5(a). In the raw image, pixel values smaller than the low saturation threshold are set to low saturation threshold, and pixel values greater than the high saturation threshold are set to high saturation threshold. The saturated image has a pixel value range between low and high saturation thresholds as shown in FIG. 5(b). For example, FIG. 5(c) is the saturated image of FIG. 4(a).
   e) Gamma correction maps the pixel values of a saturated image to a nonlinear range between specific bottom and top output thresholds following equation (2) and FIG. 6(a). The bottom and top output thresholds are set to parameters that yield the best contrast between fatty and dense (fibroglandular) tissue for example 0.01 and 1 respectively, and gamma correction factor is set to 0.5. After gamma correction, FIG. 5(c) becomes FIG. 6(b).

$$\text{Gamma Corrected Image} = \left[\frac{I - low_{in}}{high_{in} - low_{in}}\right]^{\gamma} * (high_{out} - low_{out}) + low_{out} \quad (2)$$

where I represents the saturated image pixel values; $low_{in}$ and $high_{in}$ are low and high saturation thresholds respectively as seen in FIGS. 5(a) and 6(a), $low_{out}$ and $high_{out}$ are the specific bottom and top output thresholds as 'low out' and 'high out' in FIG. 6(a), and γ controls a weight between low out and high out.

Figure 7:
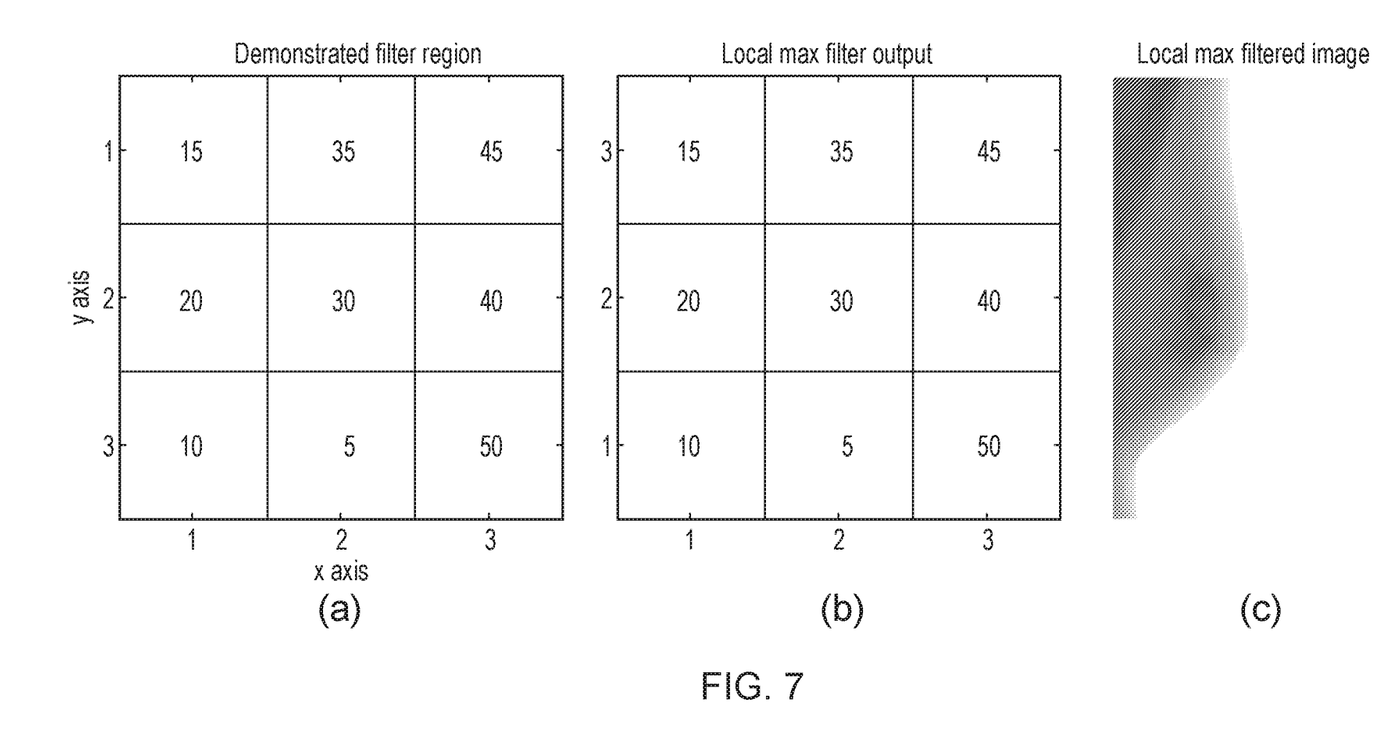
FIG. 7 shows a local max transform. Taking a 3×3 image region (a) as an example, a local maximum transform implemented by the first filter extracts the maximum pixel value from this region. The first filter replaces the centre pixel value with the regional maximum as seen in (b). Local maximum transform on FIG. 6(b) yields FIG. 7(c).

2) Local maximum transform:
   A 2-dimensional first filter is designed to extract the maximum pixel value from a region of interest (ROI) of 5 mm by 5 mm. Applying this first filter to the gamma corrected image yields an output where its pixel represents the maximum pixel value from the ROI centring on this pixel location. A demonstration of such local maximum transform is shown in FIGS. 7(a) and 7(b), and the transformed FIG. 6(b) is shown in FIG. 7(c).

Figure 8:
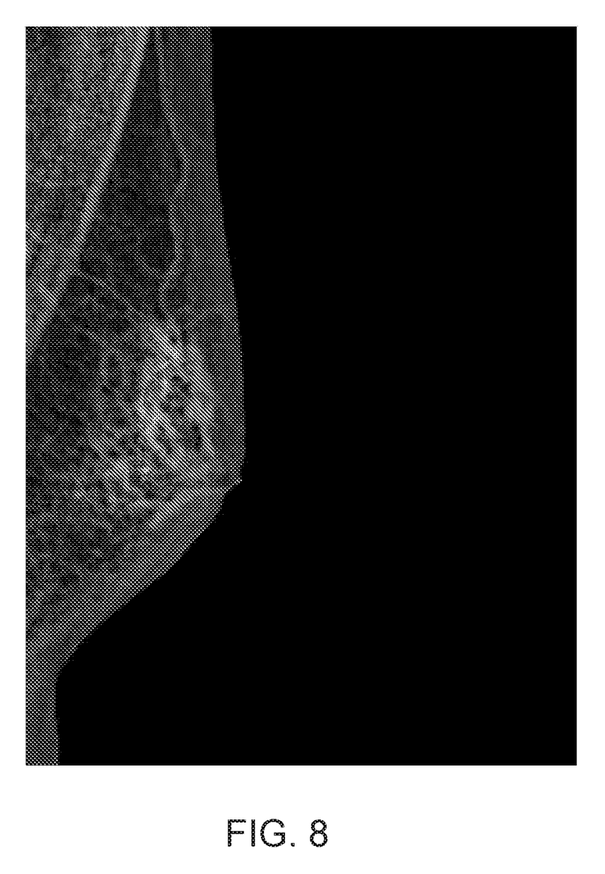
FIG. 8 shows a ratio image derived from a pixel-wise ratio between FIG. 6(b) and FIG. 7(c) where the pixel values outside of the breast region are set to zero.
Figure 9:
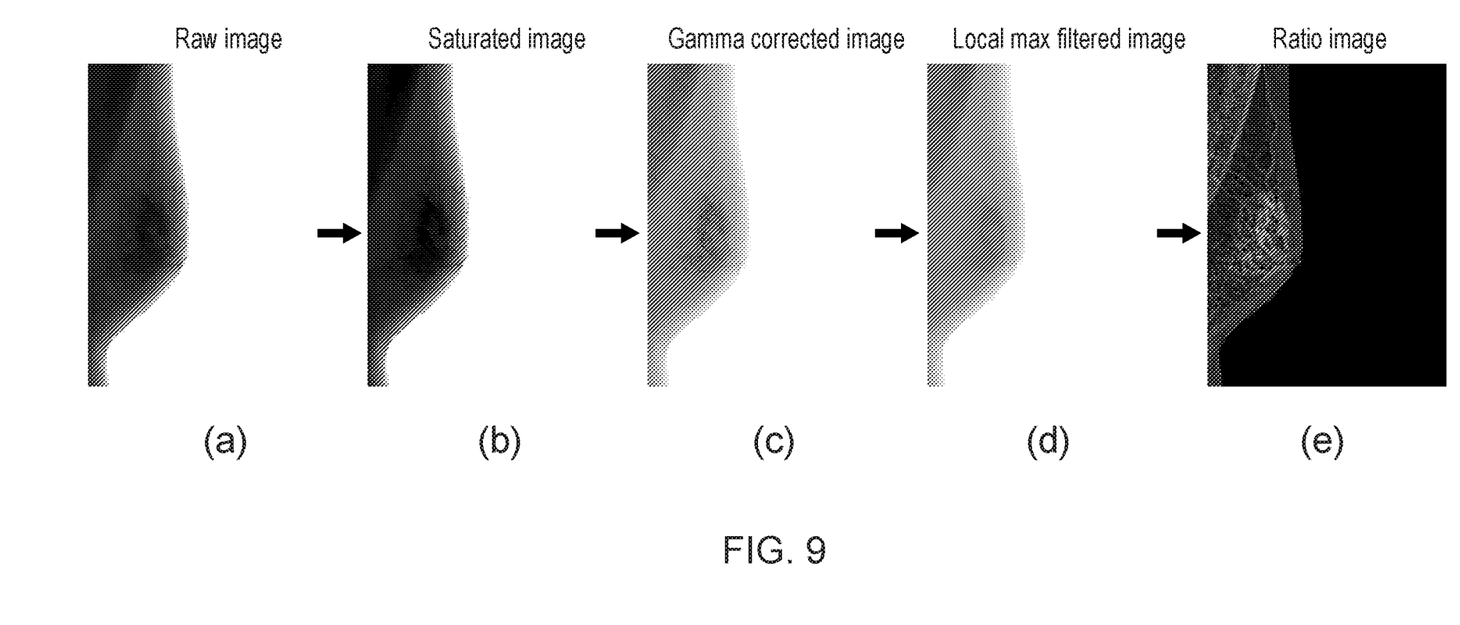
FIG. 9 shows workflow of normalizing a raw mammogram to a ratio image. The ratio image (f) is the pixel-wise ratio between (c) gamma corrected image and (d) local maximum image. The former is obtained from gamma correction of a 2% saturated image (b), and the latter is derived by filtering (c) using a local maximum first filter.

3) Ratio map derivation:
   A ratio map is used here to describe the pixel-wise ratio between the gamma corrected raw image and its local maximum map. For example, FIG. 8 is the result of FIG. 6(b) (pixel-wise) divided by FIG. 7(c). After scaling the floating-point ratio map to a 16-bit image, a final normalised image can be obtained. The entire workflow of deriving normalised ratio image from raw image is abstracted in FIG. 9.

Figure 2:
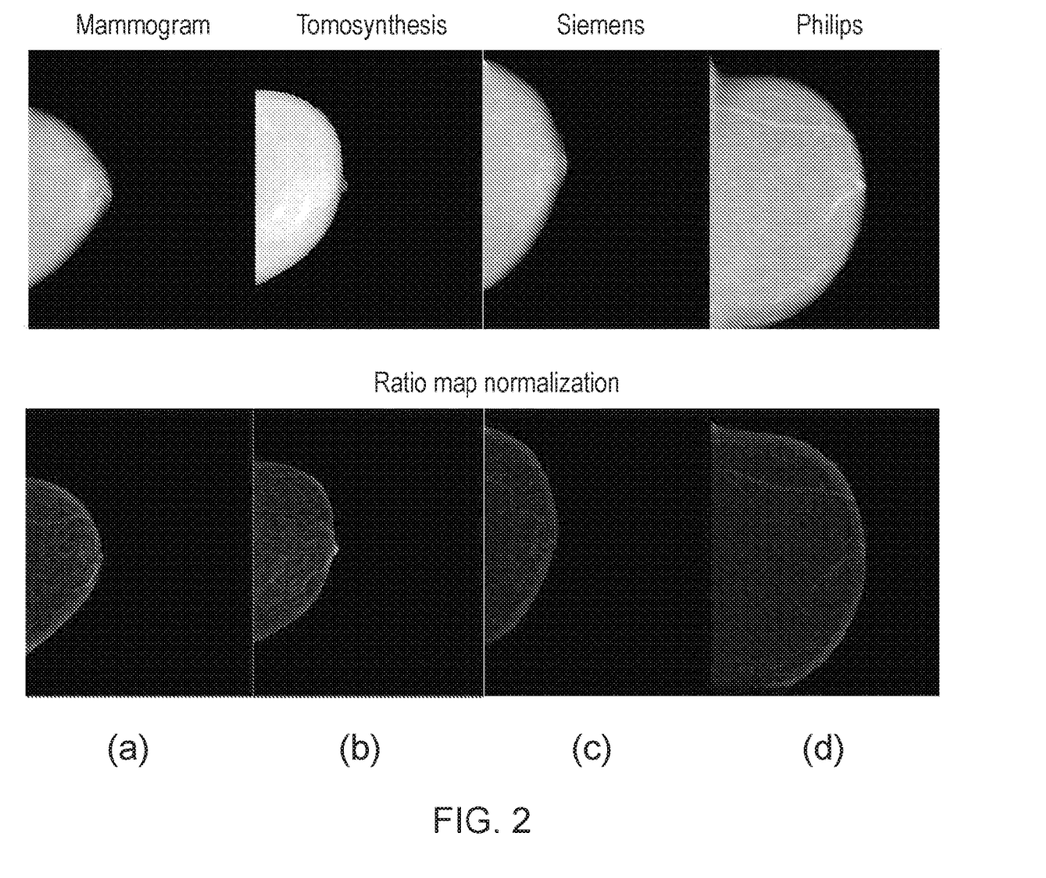
FIG. 2 shows two pairs of images: raw mammogram FIG. 2(a) and tomosynthesis FIG. 2(b) produced via imaging equipment from the same manufacturer (top row); raw mammograms from the same modalities but different manufacturers Siemens FIG. 2(c) and Philips FIG. 2(d); the ratio map normalisation (bottom row) removes the distinction between each raw image pairs, and further enhances the tissue structure.

The pixel value in the normalised image represents a relative magnitude between this pixel and its neighbors in the raw image, regardless of imaging conditions. As seen in FIG. 2, the proposed normalisation algorithm mitigates the difference between mammograms from different modalities and manufacturers. Furthermore, the normalisation naturally amplifies the image gradient, in turn enhancing the breast tissue with sharp edges. This may further facilitate the extraction of important tissue features, such as breast arterial calcification.

This invention has been described by way of example only, modifications and alternatives will be apparent to those skilled in the art. All such embodiments and modifications are intended to fall within the scope of the claims.

The invention claimed is:

1. A method for transformation of a raw mammogram including an image of a breast to normalise presentation, comprising the steps of:
   1) creating a contrast enhanced mammogram for improved visibility of breast tissue composition, wherein a region of image of the breast in the raw mammogram is segmented and a contrast-stretching algorithm applied to the segmented region, wherein the contrast stretching algorithm includes a correction performed on scaled pixel values of the raw mammogram;
   2) creating a local maximum map of the contrast enhanced mammogram by performing a local maximum transform, wherein a 2-dimensional first filter extracts a maximum pixel value from a region of interest (ROI); and
   3) deriving a ratio map which includes a pixel-wise ratio between the contrast enhanced mammogram and the local maximum map, wherein a pixel value of the ratio map is a measure of a relative response of the pixel of the ratio map to its local maximum in the raw mammogram.

2. A method according to claim 1 wherein in step 1) the breast region is segmented as follows, from the raw mammogram, a binary image is derived where non-zero pixels indicate the location of the breast in the corresponding raw mammogram image.

3. A method according to claim 2 wherein a top and bottom percentile of the pixel values in the breast region are determined as saturation thresholds.

4. A method according to claim 3 in which the low and high saturation thresholds are in a range of 0.5% to 5% of the lowest and highest respectively of the pixels according to their pixel values.

5. A method according to claim 2 wherein in the raw mammogram, pixel values smaller than a low saturation threshold are set to the low saturation threshold, and pixel values greater than a high saturation threshold are set to the high saturation threshold to make a saturated image.

6. A method according to claim 5 wherein the saturated image has a pixel value range between low and high saturation thresholds.

7. A method according to claim 2 wherein the contrast-stretching algorithm includes gamma correction on a saturated raw mammogram where saturation parameters are determined from scaled pixels in the breast region.

8. A method according to claim 1 wherein applying the contrast-stretching algorithm includes segmenting the breast region in the raw mammogram and scaling pixel values in the breast region.

9. A method according to claim 1 wherein in step 1) pixel values inside the breast region in the raw mammogram are scaled to a range between 0 and 1 followed by a logarithm transform.

10. A method according to claim 1 wherein the contrast stretching algorithm includes a correction Performed on scaled pixel values of an image in which the breast region has saturated scaled pixel values.

11. A method according to claim 1 wherein in step 1) image saturation thresholds are determined such that guided by the segmentation, scaled pixels in the breast region of the raw mammogram are sorted in ascending order based on pixel values.

12. A method according to claim 11 in which the correction includes saturation parameters which quantify low and high saturation thresholds of pixels in the breast region.

13. A method according to claim 11, wherein gamma correction maps the pixel values of a saturated image to a nonlinear range between specific bottom and top output thresholds.

14. A method according to claim 11 wherein the bottom and top output thresholds are set to parameters that yield a higher contrast between fatty and dense, i.e. (fibroglandular), tissue than in the raw mammogram.

15. A method according to claim 1 wherein the first filter extracts the maximum pixel value from a 3×3 image region and replaces the center pixel value with the regional maximum.

16. A method according to claim 1 wherein a customised second filter is applied to the ratio map to generate a BACs probability image.

17. A method according to claim 16 wherein the customised second filter uses Frangi's vessel enhancement filter, tuned to accommodate the characteristics of BACs and a mammogram, to obtain a measure of vessel-probability.

18. A method according to claim 1 wherein as pixel values of the ratio map range from 0 to 1, a rescaling to an 8, 16, 32-or 64-bit integer image obtains a normalised range.

19. A system for transformation of a raw mammogram including an image of a breast to normalise presentation, the system comprising a processor in communication with a memory arranged to:
1) create a contrast enhanced mammogram for improved visibility of breast tissue composition, wherein a region of image of the breast in the raw mammogram stored in the memory is segmented and the processor is arranged to implement a contrast-stretching algorithm applied to the segmented region, wherein the contrast stretching algorithm includes a correction performed on scaled pixel values of the raw mammogram;
2) create a local maximum map of the contrast enhanced mammogram stored in the memory by performing a local maximum transform, wherein a 2-dimensional first filter implemented by the processor extracts a maximum pixel value from a region of interest (ROI); and
3) use the processor to derive a ratio map and store it in the memory, wherein the ratio map includes a pixel-wise ratio between the contrast enhanced mammogram and the local maximum map stored in the memory, wherein a pixel value of the ratio map is a measure of a relative response of the pixel of the ratio map to its local maximum in the raw mammogram.

* * * * *